US00RE36775E

United States Patent [19]

Hoheisel

[11] E Patent Number: Re. 36,775

[45] Reissued Date of Patent: Jul. 11, 2000

[54] COLLECTION TARPAULIN

[76] Inventor: Mark G. Hoheisel, 1020 Purple Sage Ct., Menasha, Wis. 54952

[21] Appl. No.: 09/201,428

[22] Filed: Nov. 30, 1998

Related U.S. Patent Documents

Reissue of:

[64] Patent No.: 5,580,635
Issued: Dec. 3, 1996
Appl. No.: 08/398,989
Filed: Mar. 6, 1995

[51] Int. Cl.[7] ..... A01D 46/22; B32B 3/02

[52] U.S. Cl. ..... 428/66.1; 428/64.1; 56/329; 56/328.1

[58] Field of Search ..... 52/3, 4, 5; 428/64.1, 428/66.1, 131; 56/329, 328.1

[56] References Cited

U.S. PATENT DOCUMENTS

| | | | |
|---|---|---|---|
| 5,156 | 6/1847 | Collyer . | |
| 151,136 | 5/1874 | Kelsey et al. . | |
| 816,186 | 3/1906 | Roberts | 56/329 |
| 1,058,241 | 4/1913 | Jensen . | |
| 1,286,947 | 12/1918 | Creed . | |
| 1,338,142 | 4/1920 | Lundy . | |
| 1,536,167 | 5/1925 | Totten . | |
| 2,519,678 | 8/1950 | MacKenzie | 56/329 |
| 3,490,216 | 1/1970 | Gonzalez | 56/329 |
| 3,862,876 | 1/1975 | Graves | 52/3 X |
| 3,987,592 | 10/1976 | Herminghaus et al. | 428/131 X |
| 4,252,850 | 2/1981 | de Winter | 52/3 X |
| 4,366,949 | 1/1983 | Staub, Sr. | 56/329 X |
| 4,542,050 | 9/1985 | Gallant | 52/3 X |
| 4,580,372 | 4/1986 | Osborn | 428/131 X |
| 4,761,944 | 8/1988 | Glisan | 56/329 |
| 4,901,513 | 2/1990 | Kim et al. | 56/329 |
| 4,938,607 | 7/1990 | Kelley | 383/4 |
| 5,406,659 | 4/1995 | Camp | 52/3 X |
| 5,524,423 | 6/1996 | Haley | 56/329 X |

FOREIGN PATENT DOCUMENTS

| | | | |
|---|---|---|---|
| 546240 | 3/1922 | France | 428/131 |
| 340079 | 10/1929 | United Kingdom | 428/131 |

*Primary Examiner*—Daniel Zirker
*Attorney, Agent, or Firm*—Donald Cayen

[57] ABSTRACT

A collection tarpaulin is comprised of top and bottom sheets. The top sheet partially overlies the bottom sheet. Contiguous portions of their respective peripheries are joined together to form a pouch and an exposed portion of the bottom sheet. Trimmings from a tree or bush fall onto the exposed portion of the bottom sheet. By lifting the free end of the bottom sheet, the trimmings slide by gravity into the pouch for disposal. The collection tarpaulin may be made from a single sheet or from two separate sheets. The collection tarpaulin may be rectangular or circular in shape. For trimming long hedges, the collection tarpaulin can be much longer than it is wide.

17 Claims, 3 Drawing Sheets

COLLECTION TARPAULIN

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to lawn and garden care, and more particularly to apparatus that facilitates removal of tree and bush trimmings.

2. Description of the Prior Art

It is a common practice for persons to periodically trim the trees and bushes in their yards. In addition to enhancing the appearance of the trees and bushes, proper trimming promotes their healthy growth.

Unfortunately, a second task is always required when a tree or bush is trimmed. That task is to remove the trimmed branches, twigs, and leaves from the ground. The usual practice is to manually rake the trimmings into a pile and to place the pile into a receptacle such as a basket or wheelbarrow. The receptacle is then transported to a disposal location, where it is emptied. Finally, the empty receptacle is returned to its storage place.

Raking the trimmings into a pile and placing the pile in a receptacle is a tedious project that can take as much time and effort as the trimming operation. That is especially true if the ground surrounding the tree or bush is covered with a decorative material such as wood or stone chips. In that situation, the clean-up process becomes much more difficult, because the trimmings cannot be raked without also raking the decorative material. Either the trimmings must be picked up by hand as individual pieces, or the decorative material must be hand separated after being raked together with the trimmings into a pile.

Thus, a need exists for an improved way to clean up tree and bush trimmings.

SUMMARY OF THE INVENTION

In accordance with the present invention, a collection tarpaulin is provided that greatly eases the task of picking up trimmings from trees and bushes. This is accomplished by fabricating the collection tarpaulin with a large pouch that stores the trimmings for transportation to a disposal location.

In one embodiment, the collection tarpaulin is comprised of a rectangular bottom sheet that can be of any practical size. A top sheet has the same length but a considerably smaller width than the bottom sheet. The top sheet is overlaid on the bottom sheet. One long end of the top sheet is contiguous with a long end of the bottom sheet, and the two short edges of the top sheet are contiguous with respective portions of the short edges of the bottom sheet. The two sheets are joined together along their contiguous ends and edges. The result is a collection tarpaulin having an exposed portion of the bottom sheet and a pouch adjacent the bottom sheet exposed portion.

The exposed portion of the bottom sheet may have an opening through it at approximately its center. The opening is large enough to accept the trunk of a tree or bush. A slit is formed in the bottom sheet from the opening to the bottom sheet end opposite the pouch.

In use, a person lays the collection tarpaulin on the ground next to the tree or bush to be trimmed. He pulls the slit past the tree or bush trunk until the opening reaches the trunk.

With the collection tarpaulin flat on the ground, the person trims the tree or bush in the normal manner such that the trimmings fall onto the exposed portion of the bottom sheet. When the trimming is completed, the person merely lifts the tarpaulin bottom sheet opposite the pouch. The trimmings slide by gravity into the pouch. The person then carries or drags the tarpaulin with the filled pouch to a disposal location. The trimmings are thus cleaned up in a quick and efficient manner without any additional work.

If desired, the top and bottom sheets of the collection tarpaulin of the invention can be made from a single sheet that is folded over along a fold line. In that design, the contiguous edges of the sheet adjacent the fold line are joined together to form the pouch.

In another embodiment, the bottom sheet has a circular periphery, and the top sheet has the shape of a segment. The circular portion of the segment periphery is overlaid on and joined to a portion of the bottom sheet periphery. The resulting collection tarpaulin has a pouch and an exposed portion of the bottom sheet. An opening and slit can be formed in the bottom sheet exposed portion.

Especially when used for trimming hedges, the collection tarpaulin can be much longer than it is wide. Further, the collection tarpaulin used with hedges need not have an opening and slit. The collection tarpaulin is laid on the ground with the exposed portion of the bottom sheet under the hedge. Trimmings fall onto the exposed portion of the bottom sheet. From there, they slide into the pouch for disposal.

The method and apparatus of the invention, using a pouch formed in a flexible sheet, thus enables persons to easily clean up trimmings from trees and bushes. The prior requirement of raking or otherwise handling the trimmings after they fall to the ground is eliminated.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
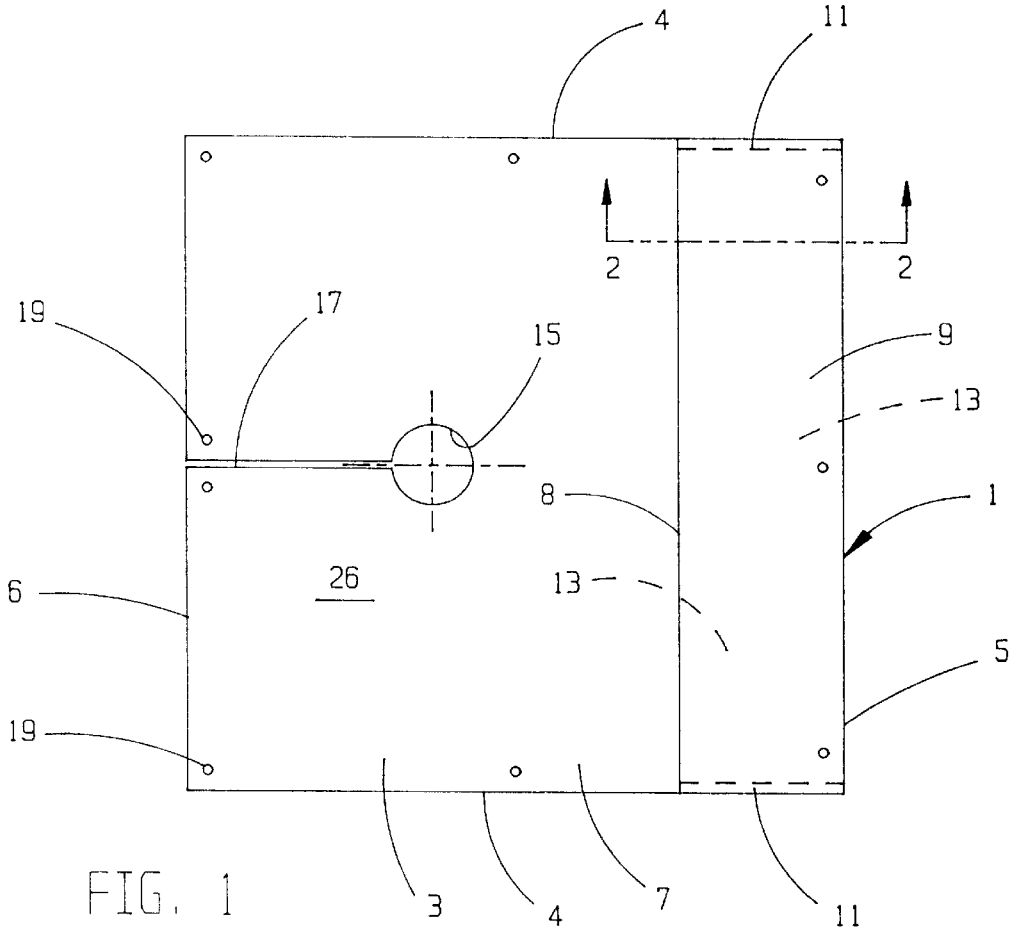
FIG. 1 is a top view of the collection tarpaulin of the present invention.
Figure 2:
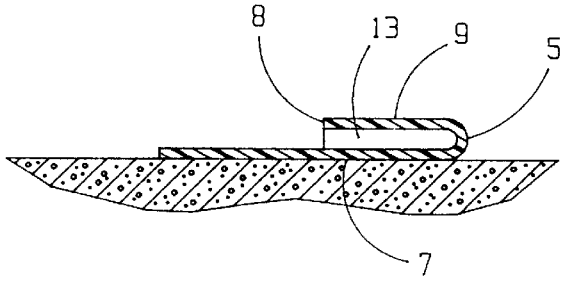
FIG. 2 is a cross sectional view taken along line 2—2 of FIG. 1.

Referring to FIGS. 1 and 2, a collection tarpaulin 1 is illustrated that includes the present invention. The collection tarpaulin 1 is particularly useful for collecting trimmings from trees and bushes, but it will be understood that the invention is not limited to lawn and garden applications.

The collection tarpaulin 1 is made from a single rectangular shaped sheet 3 of flexible material such as canvas or heavy plastic. The sheet 3 has opposed edges 4, a first end 6, and a second end 8. The sheet is folded over along fold line 5 so as to create a bottom sheet 7 and a smaller top sheet 9. The top sheet 9 preferably has approximately one fourth the area of the bottom sheet 7. The top sheet is laid in facing contact with the bottom sheet with the edges 4 of the top and bottom sheets being contiguous. (For clarity, in FIG. 2 the top sheet is shown spaced above the bottom sheet.) The top sheet is joined, as by sewing stitches 11, along the lengths of their edges 4 that are contiguous. The result is that a pouch 13 is formed in the sheet 3, and there is an exposed portion 26 of the bottom sheet 7.

An opening 15 is cut through the exposed portion 26 of the bottom sheet 7 at approximately its midpoint. A slit 17 is cut from the bottom sheet edge 6 to the opening 15. If desired, grommets 19 can be assembled around the edges of the collection tarpaulin 1.

Figure 3:
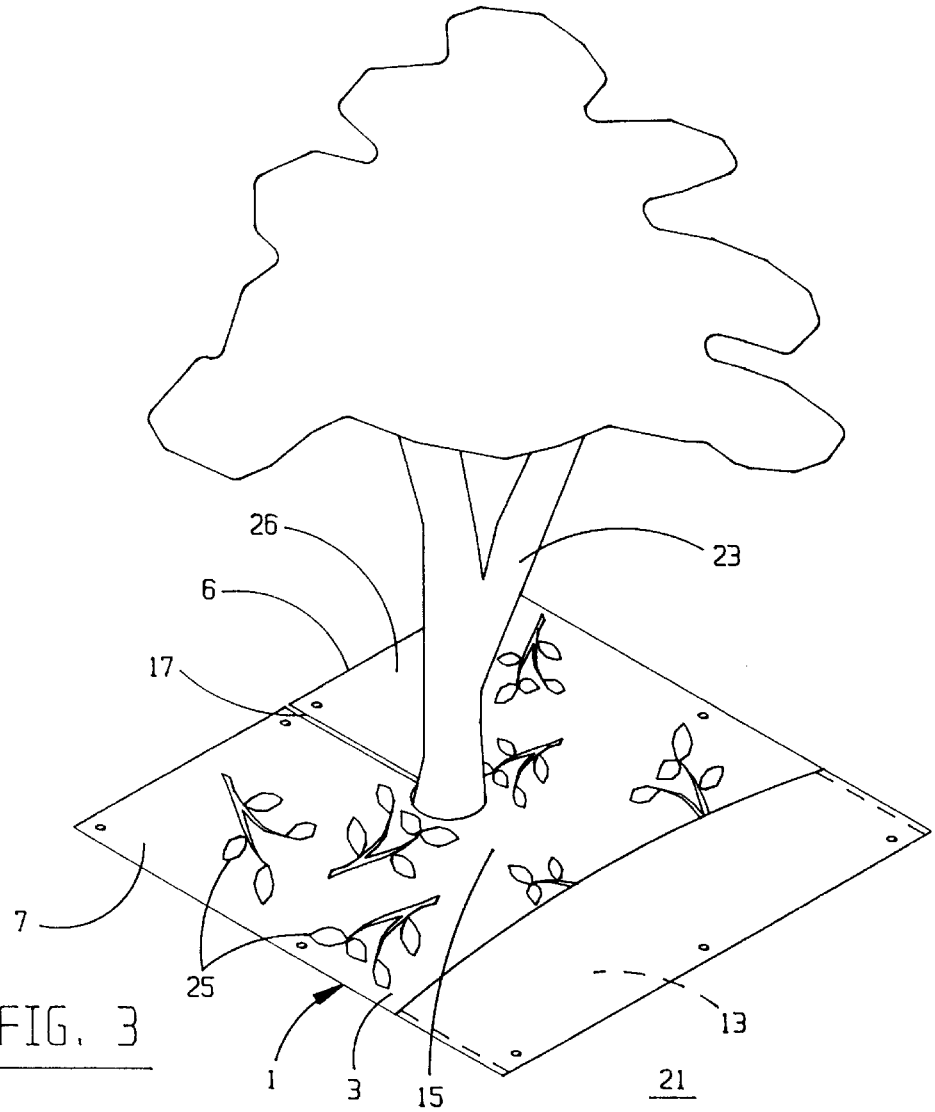
FIG. 3 is a perspective view showing the collection tarpaulin in use.

The collection tarpaulin 1 is used by placing it on the ground 21 near a tree or bush typically represented at reference numeral 23, FIG. 3. The collection tarpaulin is pulled over the ground such that the slit 17 slides past the tree 23 until the opening 15 reaches the tree. The tarpaulin is spread flat on the ground 21. Stakes of any suitable type can be inserted through the grommets 19 and into the ground to hold the collection tarpaulin in place on windy days. Then the tree is trimmed in the usual manner. Trimmings 25 from the tree or bush fall onto the exposed portion 26 of the bottom sheet 7.

When the tree 23 is completely trimmed, the end 6 of the sheet 3 is raised on both sides of the slit 17. The trimmings 25 slide by gravity from the bottom sheet exposed portion 26 toward and into the pouch 13. When all the trimmings are in the pouch, the collection tarpaulin 1 can be carried or dragged to a disposal location. Turning the pouch upside down at the disposal location causes the trimmings to drop out of the pouch. In that manner, the trimmings are quickly and easily removed from the area under the tree without having to rake them from the ground 21. In fact, the trimmings are disposed of without ever having to handle them.

Figure 4:
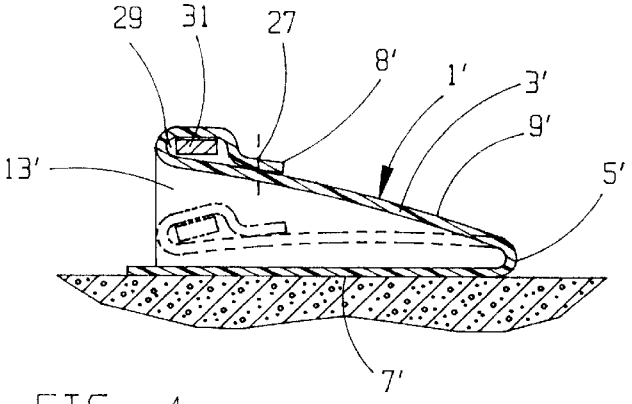
FIG. 4 is a view similar to FIG. 2, but showing an alternate construction for the collection tarpaulin.

Looking at FIG. 4, a modified collection tarpaulin 1' is made from a sheet 3' folded along a fold line 5' into a bottom sheet 7' and a top sheet 9'. The free end 8' of the top sheet 9' is folded over and sewn to the top sheet 9' along stitch lines 27 to form a long loop 29. A long flexible snap band of metal 31 is placed in the loop 29. The snap band 31 can be manually placed in a first mode as shown in solid lines in FIG. 4 to hold the pouch 13' open. Alternately, the snap band can be placed in a second mode whereat the top sheet end 8' and band are in close contact with the bottom sheet 7', as shown in phantom lines, to thereby close the pouch 13'.

Figure 5:
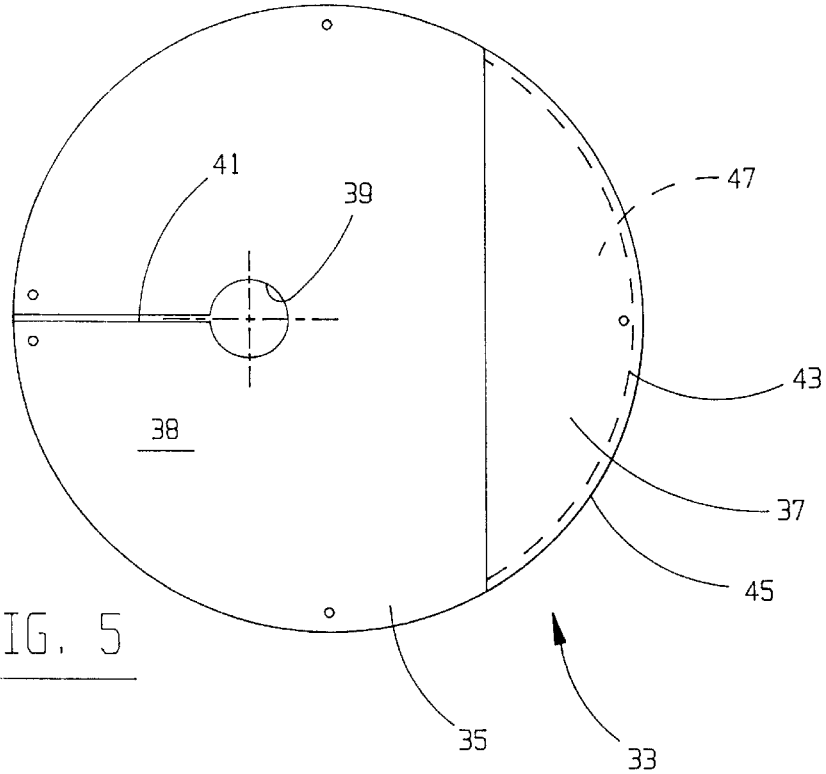
FIG. 5 is a top view of a modified embodiment of the invention.

Now turning to FIG. 5, a collection tarpaulin 33 is depicted that has a circular shape. The collection tarpaulin 33 has a circular bottom sheet 35 that is a separate piece from a smaller top sheet 37. The top sheet 37 is in the shape of a segment having an outer diameter that is the same as the outer diameter of the bottom sheet 35. The top sheet 37 is sewn at stitch lines 43 along the contiguous portions 45 of the peripheries of the two sheets such that the top and bottom sheets cooperate to form a pouch 47. The exposed portion 38 of the bottom sheet has a central opening 39 and a slit 41. The collection tarpaulin 33 is used in the same manner as the collection tarpaulins 1 and 1' described previously in conjunction with FIGS. 1–4.

Figure 6:
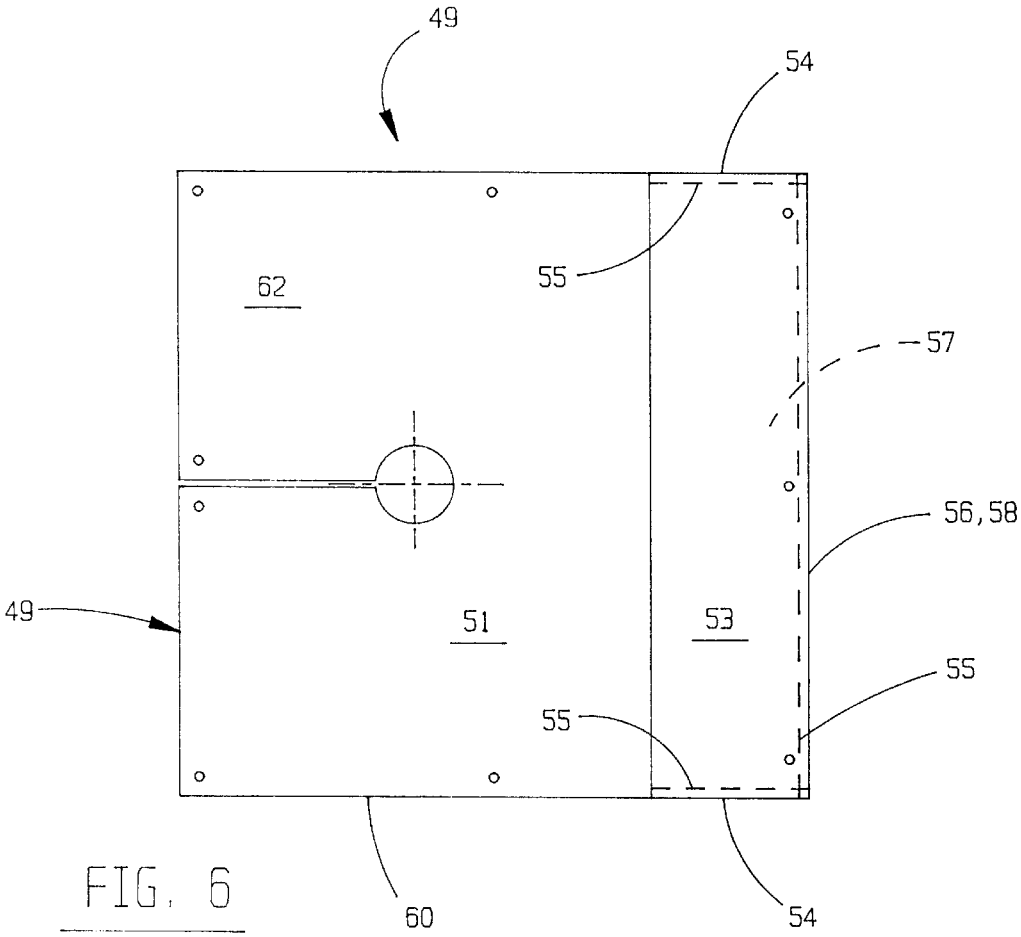
FIG. 6 is a top view of another embodiment of the invention.

The general construction of the collection tarpaulin 33 of FIG. 5 can also be used with rectangular shaped collection tarpaulins. Looking at FIG. 6, a collection tarpaulin 49 has a rectangular bottom sheet 51 and a separate top sheet 53. The top sheet 53 is overlaid on the bottom sheet 51 such that their ends 56 and 58, respectively, are contiguous. The edges 54 of the top sheet are contiguous with corresponding portions of the bottom sheet edges 60. The two sheets 51 and 53 are sewn at stitch lines 55 along their contiguous ends 56 and 58 and edges 54 and 60 to form a pouch 57 and an exposed portion 62 of the bottom sheet.

Figure 7:
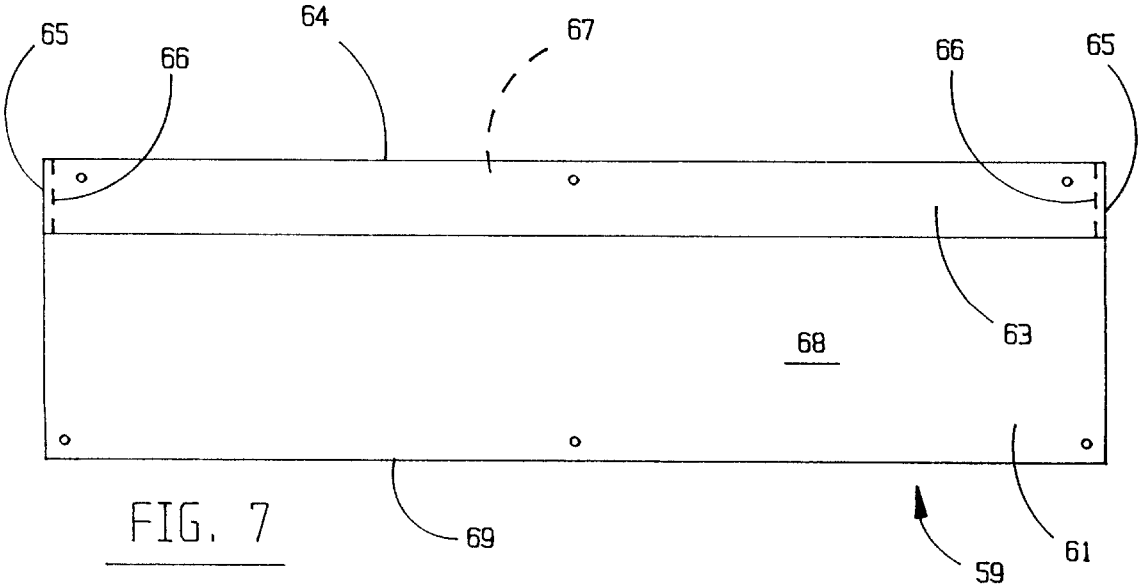
FIG. 7 is a top view of a further modified embodiment of the invention.

FIG. 7 shows a collection tarpaulin 59 that is relatively long compared to its width. The bottom sheet 61 and the top sheet 63 may be made from a single sheet and folded over along fold line 64 and stitched at lines 66 along their contiguous edges 65, as is illustrated. Alternately, the bottom and top sheets 61 and 63, respectively, may be separate pieces that are stitched along three contiguous ends and edges like the collection tarpaulin of FIG. 6. Either construction results in a long pouch 67. The exposed portion 68 of the bottom sheet of the collection tarpaulin 59 does not have a central opening or a slit.

The collection tarpaulin 59 is especially useful for trimming long hedges. The free end 69 of the bottom sheet 61 is placed along the base of the hedge. The hedge can be trimmed for the length of the collection tarpaulin before the tarpaulin has to be moved. In other respects, the function of the collection tarpaulin 59 is similar to that of the collection tarpaulins 1, 1', 33, and 49 described previously.

In addition to its usefulness out-of-doors, the collection tarpaulin of the invention can also be very beneficial inside the home. For example, the collection tarpaulin can be placed under a Christmas tree to collect dropped needles. The collection tarpaulin enables easy disposal of the needles while eliminating the usual chore of vacuuming the floor under the tree.

An example of a collection tarpaulin that works very well for outdoor use is as follows. The collection tarpaulin has a rectangular shape with a construction as illustrated in FIGS. 1 and 2. The bottom sheet is 5.50 feet long and five feet wide. The top sheet is five feet long and 18 inches wide. Accordingly, the area of the top sheet is approximately one-fourth that of the exposed portion of the bottom sheet. The collection tarpaulin central opening has a diameter of 12 inches. The collection tarpaulin conveniently folds and stores in a minimum of space.

In summary, the results and advantages of trimming trees and bushes can now be more fully realized. The collection tarpaulin of the invention enables quick and easy clean-up of branches and leaves trimmed from the trees and bushes without having to rake them. This desirable result comes from using the combined functions of the exposed portion of the bottom sheet and the pouch. The exposed portion of the bottom sheet prevents trimmings from reaching the ground, and the pouch holds the trimmings for convenient disposal.

It will also be recognized that in addition to the superior performance of the collection tarpaulin, its construction is such as to be of very modest cost. Consequently, both home owners and professional landscapers can easily afford to add the tarpaulin to their collection of yard tools.

Thus, it is apparent that there has been provided, in accordance with the invention, a collection tarpaulin that fully satisfies the aims and advantages set forth above. While the invention has been described in conjunction with specific embodiments thereof, it is evident that many alternatives, modifications, and variations as to sizes, shapes, and materials will be apparent to those skilled in the art in light of the foregoing description. Accordingly, it is intended to embrace all such alternatives, modifications, and variations as fall within the spirit and broad scope of the appended claims.

I claim:

1. A collection tarpaulin for collecting trimmings from trees and bushes comprising:

a. a bottom sheet having first and second opposed ends of a first predetermined length and opposed edges of a second predetermined length; and b. a top sheet having first and second opposed ends of the first predetermined length and opposed edges of a third predetermined length less than the second predetermined length, the top sheet overlying a portion of the bottom sheet with the top sheet first end contiguous to and joined to the bottom sheet first end and with the opposed edges of the top sheet contiguous to and joined to respective portions of the bottom sheet edges, wherein:

i. the second end of the top sheet defines a loop therealong; and ii. a snap band is inserted in the top sheet loop, the snap band being selectively placeable in a first mode whereat the snap band holds the pouch open and in a second mode whereat the snap band holds the pouch closed, so that the top sheet cooperates with the underlying portion of the bottom sheet to create a collection tarpaulin with a pouch and an exposed portion of the bottom sheet.

2. A collection tarpaulin for collecting trimmings from trees and bushes comprising:

a. a bottom sheet having first and second opposed ends of a first predetermined length and opposed edges of a second predetermined length; and b. a top sheet having first and second opposed ends of the first predetermined length and opposed edges of a third predetermined length less than the second predetermined length, the top sheet overlying a portion of the bottom sheet with the top sheet first end contiguous to and joined to the bottom sheet first end and with the opposed edges of the top sheet contiguous to and joined to respective portions of the bottom sheet edges, wherein the exposed portion of the bottom sheet is formed with an opening therethrough and a slit extending from the opening to the bottom sheet second end, so that the top sheet cooperates with the underlying portion of the bottom sheet to create a collection tarpaulin with a pouch and an exposed portion of the bottom sheet.

3. A collection tarpaulin for collecting trimmings from trees and bushes comprising:

a. a bottom sheet having first and second opposed ends of a first predetermined length and opposed edges of a second predetermined length; and b. a top sheet having first and second opposed ends of the first predetermined length and opposed edges of a third predetermined length less than the second predetermined length, the top sheet overlying a portion of the bottom sheet with the top sheet first end contiguous to and joined to the bottom sheet first end and with the opposed edges of the top sheet contiguous to and joined to respective portions of the bottom sheet edges, wherein the top sheet and the bottom sheet are made from separate pieces of material, so that the top sheet cooperates with the underlying portion of the bottom sheet to create a collection tarpaulin with a pouch and an exposed portion of the bottom sheet.

4. A collection tarpaulin for collecting trimmings from trees and bushes comprising:

a. bottom sheet having first and second opposed ends of a first predetermined length and opposed edges of a second predetermined length; and b. a top sheet having first and second opposed ends of the first predetermined length and opposed edges of a third predetermined length less than the second predetermined length, the top sheet overlying a portion of the bottom sheet with the top sheet first end *contiguous to and joined to the bottom sheet first end and* with the opposed edges of the top sheet contiguous to and joined to respective portions of the bottom sheet edges, wherein the top sheet and the bottom sheet are made from a single piece of material that is folded over along a fold line to form the top and bottom sheets, the fold line defining the respective first ends of the top and bottom sheets, so that the top sheet cooperates with the underlying portion of the bottom sheet to create a collection tarpaulin with a pouch and an exposed portion of the bottom sheet.

5. Collection tarpaulin for collecting trimmings from trees and bushes comprising:

a. a bottom sheet having first and second opposed ends of a first predetermined length and opposed edges of a second predetermined length; and b. a top sheet having first and second opposed ends of the first predetermined length and opposed edges of a third predetermined length less than the second predetermined length, the top sheet overlying a portion of the bottom sheet with the top sheet first end contiguous to and joined to the bottom sheet first end with the opposed edges of the top sheet contiguous to and joined to respective portions of the bottom sheet edges, wherein the first predetermined length is much greater than the second predetermined length, so that the collection tarpaulin is suitable for collecting trimmings from long hedges, so that the top sheet cooperates with the underlying portion of the bottom sheet to create a collection tarpaulin with a pouch and an exposed portion of the bottom sheet.

6. A collection tarpaulin comprising:

a. a bottom sheet having a circular periphery with a predetermined outer diameter; and b. a top sheet having a segment periphery with the predetermined outer diameter, the top sheet outer diameter being contiguous to and joined to a selected portion of the bottom sheet outer diameter to thereby form a pouch and an exposed portion of the bottom sheet, wherein the exposed portion of the bottom sheet is fabricated with an opening therethrough and a slit extending from the opening to the bottom sheet periphery on the opposite side of the opening as the pouch.

7. An article of manufacture useful as a collection tarpaulin for collecting trimmings from a tree or bush fabricated from a sheet of flexible material having first and second opposed ends and first and second opposed edges that is folded over along a fold line parallel to and located closer to the first end then the second end to form a top sheet and a bottom sheet with the top sheet overlying a portion of the bottom sheet and leaving a portion of the bottom sheet exposed with the first and second edges of the top sheet being contiguous with and joined to the respective underlying portions of the first and second edges of the bottom sheet to form a pouch, so that trimmings from the tree or bush can fall onto the exposed portion of the bottom sheet and the sheet second end can be lifted to slide the trimmings by gravity into the pouch.

8. The article of manufacture of claim 7 wherein the sheet first and second ends are substantially longer than the first and second edges, so that the exposed portion of the bottom sheet can be placed adjacent a long hedge to collect trimmings therefrom.

*9. Apparatus that enables material fallen from a tree or bush to be collected without having to rake or pick the material from the ground comprising a bottom sheet bounded by a bottom sheet periphery, and a top sheet bounded by a top sheet periphery and partially overlying the top sheet such that there is an underlying portion of the bottom sheet and an exposed portion of the bottom sheet, the top sheet being joined along selected sections of the top sheet periphery to the bottom sheet and cooperating with the underlying portion of the bottom sheet to create a pouch that is closed at the sections of the top sheet periphery that are joined to the bottom sheet and that is open toward the bottom sheet exposed portion, the bottom sheet exposed portion being placed on the ground under the tree or bush and being sized and configured to catch the fallen material, and the pouch being sized and configured to receive the fallen material by sliding the material from the bottom sheet exposed portion into the pouch.*

*10. A collection tarpaulin comprising:*

*a. a bottom sheet bounded by a periphery having first and second edges each having a first end point and a second end point, the bottom sheet being further bounded by a third edge that connects the respective second end points of the first and second edges and that contains no internal corners; and*

*b. a top sheet that partially overlies the bottom sheet to create an underlying portion of the bottom sheet and an exposed portion of the bottom sheet, the top sheet having a top sheet periphery a selected section of which is joined to the bottom sheet at least generally along the bottom sheet third edge in a manner such that the top and bottom sheets cooperate to form a pouch that is closed along the selected section of the top sheet periphery and that is open toward the bottom sheet exposed portion.*

*11. A collection tarpaulin for collecting and transporting material dropped from trees and bushes comprising:*

*a. a bottom sheet having a periphery including a selected edge of predetermined length and shape and having no internal corners; and*

*b. a top sheet partially overlying the bottom sheet to create an underlying portion of the bottom sheet and an exposed portion of the bottom sheet, the top sheet having a periphery that includes a selected top sheet edge that is generally the same length and shape as the selected edge of the bottom sheet, at least the respective selected edges of the top and bottom sheets being joined together to create a pouch that is closed toward the selected edges of the top and bottom sheets and that is open toward the bottom sheet exposed portion.*

*12. A collection tarpaulin for collecting and transporting material dropped from trees and bushes comprising:*

*a. a bottom sheet bounded by a quadrilateral bottom sheet periphery having opposed bottom sheet edges each of a first predetermined length, and first and second bottom sheet ends; and*

*b. a top sheet bounded by a quadrilateral top sheet periphery having opposed top sheet edges each of a second predetermined length less than the first predetermined length, and first and second top sheet ends, the top sheet overlying a portion of the bottom sheet to create an underlying portion of the bottom sheet and an exposed portion of the bottom sheet, the top sheet being joined to the bottom sheet along a first selected line extending between the top sheet edges and along a pair of second selected lines each extending between the first top sheet end and the first selected line to form a pouch that is closed along the first and second selected lines and open toward the bottom sheet exposed portion.*

*13. The collection tarpaulin of claim 12 wherein the periphery of at least the bottom sheet is a rectangle.*

*14. A collection tarpaulin for collecting and transporting material dropped from trees and bushes comprising:*

*a. a bottom sheet bounded by a quadrilateral bottom sheet periphery having opposed bottom sheet edges of a first predetermined length, and first and second bottom sheet ends; and*

*b. a top sheet bounded by a quadrilateral top sheet periphery having first and second opposed top sheet edges each of a second predetermined length less than the first predetermined length and first and second top sheet ends, the top sheet overlying a portion of the bottom sheet to create an underlying portion of the bottom sheet and an exposed portion of the bottom sheet, the top sheet being joined to the bottom sheet along a first selected line extending between the first top sheet edge and a selected one of the bottom sheet edges, and along a pair of second selected lines each extending between the first top sheet end and the first selected line to form a pouch that is closed along the first and second selected lines and open toward the bottom sheet exposed portion.*

*15. An article of manufacture useful as a collection tarpaulin for collecting matter fallen from a tree or bush fabricated from a sheet of flexible material having first and second opposed ends and opposed edges and that is folded over along a fold line generally parallel to the first end and located closer to the first end than the second end to form a top sheet and a bottom sheet with the top sheet overlying a portion of the bottom sheet and leaving a portion of the bottom sheet exposed with the top sheet being joined to the bottom sheet along at least two joining lines that extend from the sheet first end to the fold line,*

*so that the top and bottom sheets cooperate to form a pouch that is closed along the joining lines and the fold line and that is open at the top sheet first end.*

*16. A collection tarpaulin for collecting vegetative matter fallen from vegetation, said collection tarpaulin comprising:*

*a. a flexible bottom sheet having an inwardly disposed more central portion thereof, and an outer portion disposed outwardly of the more central portion; and*

*b. a top sheet overlying a portion of said bottom sheet, said top sheet being secured to said bottom sheet outwardly of the inwardly disposed more central portion of said bottom sheet, said top and said bottom*

*sheet, in combination, thereby defining a pouch having a first peripheral portion that is closed toward the outer portion of said bottom sheet and a second peripheral portion that is open toward the more central portion of said bottom sheet, the more central portion of said bottom sheet, the pouch, and the second peripheral portion being sized and configured to receive said fallen vegetative matter.*

*17. A collection tarpaulin for collecting vegetative matter fallen from vegetation, said collection tarpaulin comprising:*

*a. a flexible elongated bottom sheet having a length, and opposed first and second ends, an elongated side edge of said bottom sheet between said first and second ends, an outer portion of said bottom sheet being disposed toward the elongated side of said bottom sheet; and*

*b. a top sheet overlying the outer portion of said bottom sheet, and being secured to said bottom sheet along the elongated side edge, said top and said bottom sheet, in combination, thereby defining an elongated pouch extending along the length of said bottom sheet, said pouch being closed toward the elongated side edge, and having an opening along an edge of said top sheet displaced from said elongated side edge, both the pouch and the opening being sized and configured to receive said fallen vegetative matter.*

* * * * *